(12) United States Patent
Biskeborn et al.

(10) Patent No.: US 6,344,952 B1
(45) Date of Patent: Feb. 5, 2002

(54) SERPENTINE RESISTIVE SHUNT FOR MR HEADS HAVING CONDUCTIVE SHIELDS

(75) Inventors: Robert Glenn Biskeborn, Hollister; Tsung Yuan Chen, San Jose; Michael J. Doscher, Morgan Hill; Peter V. Koeppe, San Diego; James Devereaux Jarratt, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/648,169

(22) Filed: Aug. 25, 2000

Related U.S. Application Data

(63) Continuation-in-part of application No. 09/204,321, filed on Dec. 2, 1998, now Pat. No. 6,246,553.

(51) Int. Cl.⁷ .................................. G11B 5/33
(52) U.S. Cl. ..................................... 360/319
(58) Field of Search ................. 360/323, 319, 360/322

(56) References Cited

U.S. PATENT DOCUMENTS

| | | | |
|---|---|---|---|
| 5,465,186 A | * 11/1995 | Bajorek et al. | 360/323 |
| 5,539,598 A | * 7/1996 | Denison et al. | 360/323 |
| 5,557,492 A | * 9/1996 | Gill et al. | 360/319 |
| 6,081,409 A | * 6/2000 | Hughbanks et al. | 360/323 |
| 6,160,688 A | * 12/2000 | Okumura | 360/319 |

* cited by examiner

*Primary Examiner*—Allen Cao
(74) *Attorney, Agent, or Firm*—Lumen Intellectual Property Services, Inc.

(57) ABSTRACT

A read element for a tape drive system is disclosed. The read element generally comprises a magneto-resistive sensor electrically coupled to first and second leads and at least one electrically conductive magnetic shield proximate the magneto-resistive element. A resistor is electrically connected to the conductive magnetic shield and to one or more of the first and second leads. The resistor is disposed between the first and second leads. The resistor continuously discharges electric charge that builds up on the conductive magnetic shield. The resistor typically has a resistance that is large enough to protect against noise due electrical shorting of the conductive magnetic shield and small enough to prevent a build-up of electric charge on the shield.

2 Claims, 9 Drawing Sheets

SERPENTINE RESISTIVE SHUNT FOR MR HEADS HAVING CONDUCTIVE SHIELDS

CROSS REFERENCE TO RELATED APPLICATION

The present application is a continuation in part to the U.S. patent application Ser. No. 09/204,321 filed on Dec. 2, 1998, and now issued as U.S. Pat. No. 6,246,553, which is hereby incorporated by reference.

FIELD OF INVENTION

The present invention relates to magnetic recording heads. More particularly, the present invention relates to magnetic recording heads having conductive shields.

BACKGROUND OF INVENTION

The requirements for providing magnetic tape drives with higher data storing capacities have lead to the development of multi-track storage techniques in which a number of read elements are aligned with a number of write elements. The aligned read and write elements are bound in essentially identical read and write element pairs. The elements in each pair are placed in a distant opposition to each other such that each track of the magnetic tape is accessed by a read element and a distant write element.

The read elements conventionally contain magnetoresistive sensors fabricated by the use of thin film fabrication techniques as described in the related application. The magneto-resistive sensors are characterized by a resistance that changes in response to an external magnetic field from data stored on a magnetic tape. Each thin film magnetoresistive sensor is typically positioned in between two magnetically permeable shields. The shields guide stray magnetic fields away from the magneto-resistive element. The shields are typically thin film deposited adjacent to the magneto-resistive sensor. These thin film shields are typically electrically conductive.

The conductive shields and the magneto-resistive sensor and its contacts form a capacitor, which has a capacitance dependent on the area extension and the insulating material between the shields and the magneto-resistive sensor. During the operation of the tape drive, the magnetic recording tape is moved over the head, which is comprised of the read and write elements. The movement of the tape over the head can result in an electrical charge accumulating on the conductive shields. Such a charging process is often referred to as tribocharging. The capacitor is sometimes discharged suddenly by a transient conductive path between the magneto-resistive sensor and the shield due, e.g., to an interaction with the tape. Although, the build up of the charge on the shields tends to be slow, and therefore not disruptive, studies show that the discharge can take place abruptly, e.g. within less than 1 nanosecond. During discharge, up to 50% of the stored charge may flow through the magneto-resistive sensor itself, thus appearing as a data signal. The amplitude of such spurious signals has been predicted to be approximately 0.1 to 3 millivolts per volt of stored charge potential difference between the shield and the magneto-resistive sensor. Tribocharging potentials can reach several, if not 10s of volts. The resulting noise pulses when this charge discharges can be up to 10 mV or more in peak amplitude, a signal that is often larger than the magneto-resistive signal itself. Since the pulses are only a few nanoseconds in duration, this process may produce single bit errors in the channel.

Previous attempts have been made to prevent the charge buildup by making a short circuit connection between the magneto-resistive sensor and the shields. Unfortunately, such a permanent short circuit makes magneto-resistive elements having ductile shields more susceptible to another noise phenomenon often referred to as "telegraph noise" (TGN). The TGN is due to intermittent connections between the magnetoresistive element and the shields, e.g. caused by the presence of ductile shield material in the insulating gap between the MR sensor and the shields. The presence of a permanent electrical short to the contact on one side of the sensor makes intermittent completion of the short circuit due to conductive bridging of the shield much more likely.

Therefore, there exists a need for a magnetic tape drive with a magnetoresistive read element that is resistant to tribocharging and without unduly increasing susceptibility to telegraph noise.

OBJECTS AND ADVANTAGES

It is a primary object of the present invention to provide magnetoresistive read element that is resistive to tribocharging and telegraph noise. It is another object of the present invention to provide tape drive employing such a magnetoresistive read element.

SUMMARY OF THE INVENTION

The disadvantages of the prior art are overcome by the present invention of a read element comprising a magnetoresistive sensor electrically connected to first and second leads and at least one electrically conductive magnetic shield proximate the magneto-resistive sensor. A resistor is electrically connected to the conductive magnetic shield and to one or more of the first and second leads. The resistor is disposed between the first and second leads. The resistor continuously discharges electric charge that would otherwise build up on the conductive magnetic shield. The resistor typically has a resistance that is large enough to protect against noise due to intermittent electrical shorting by the conductive magnetic shield and small enough to prevent a build-up of electric charge on the shield. The resistance may be between about 10 k$\Omega$ and about 200 k$\Omega$. In one embodiment of the invention, the resistor is comprised of tantalum. The resistor is typically a thin film resistor disposed in substantially the same substrate plane as the magneto-resistive sensor. In a particular embodiment of the invention, the resistor is a serpentine thin film resistor that has been deposited in substantially the same substrate plane as the magneto-resistive sensor.

The read element may further comprise a second magnetic shield located adjacent the magneto-resistive sensor such that the magneto-resistive element is disposed between the first and second magnetic shields. The second shield may comprise a ferrite material, which is typically not electrically conductive. Alternatively, the second shield may comprise an electrically conductive material. When the second shield is electrically conductive, like the first shield, the resistor may be connected to the first and second shields.

The read element may be fabricated by a method according to an embodiment of the invention. According to the method, the magneto-resistive sensor, first and second conductive contacts and one or more resistors are formed on a first insulating layer. A conductive magnetic shield is formed over a second insulating layer, which is formed over the magneto resistive read element such that the resistor or resistors electrically connect to the shield. The first insulating layer may be deposited over another shield that may also be electrically connected to the resistor.

Embodiments of read elements of the present invention find use in magnetic tape drives. Such a tape drive typically includes a read head that incorporates one or more read elements of the type described above. The tape drive typically includes some means for moving a tape over the read elements.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1A:
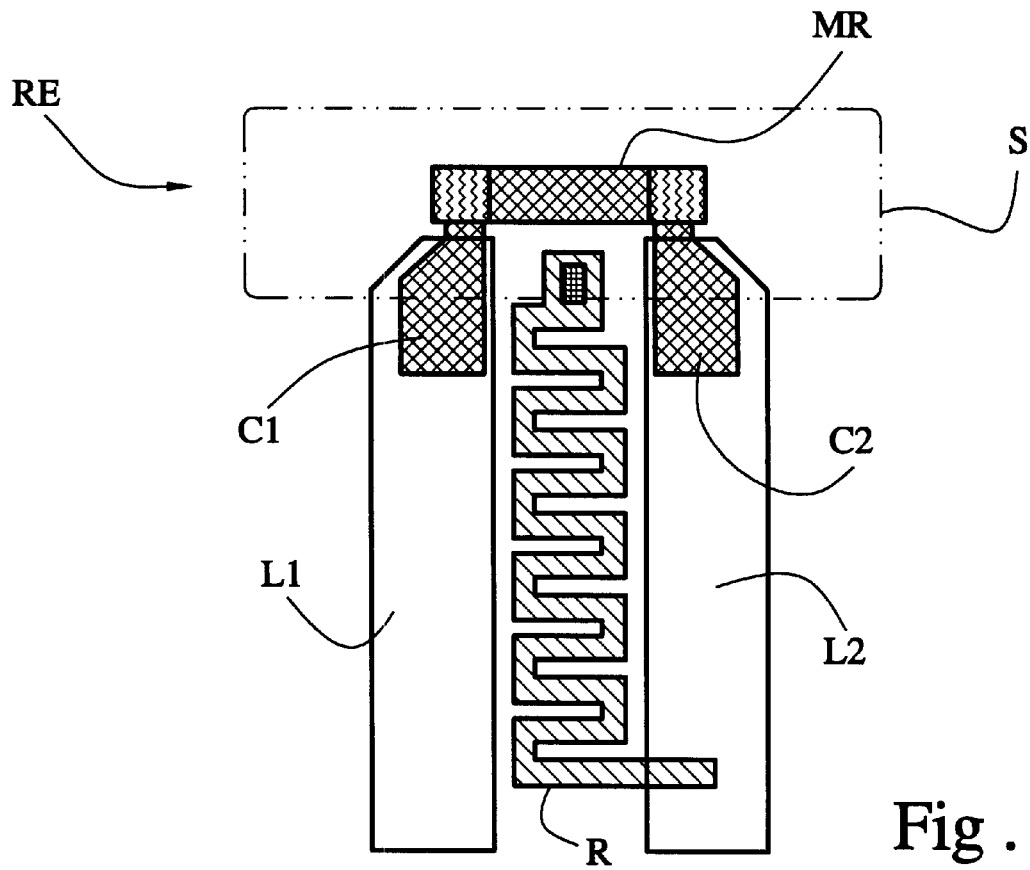
FIG. 1A shows a schematic drawing of a read element according to an embodiment of the invention.
Figure 1B:
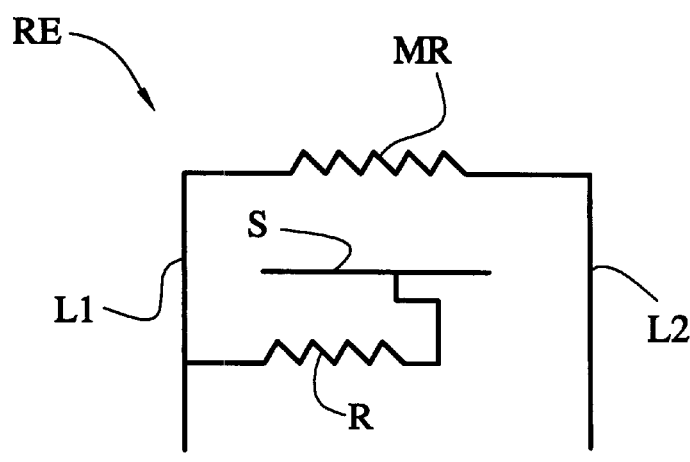
FIG. 1B shows a schematic diagram of an electrical circuit equivalent to the read element depicted in FIG. 1A.

FIG. 1A shows a schematic diagram of a read element RE according to an embodiment of the present invention. FIG. 1B shows a schematic diagram of an equivalent electrical circuit.

The read element RE according to the present invention has a thin film shield S separated from a magneto-resistive sensor MR, contacts C1, C2, leads L1, L2 and resistor R by insulating film layers (not shown) as is known to those skilled in the art. The magneto-resistive sensor MR, first and second leads L1, L2 and resistor R may be included in a central deposition layer D deposited on a substrate by conventional means.

Figure 1C:
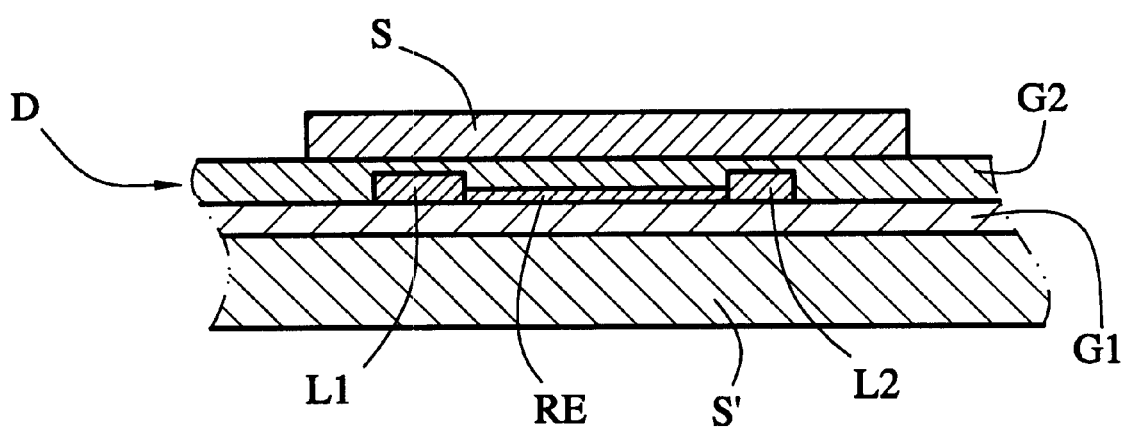
FIG. 1C shows a cross-sectional schematic diagram of the read element depicted in FIG. 1A.

FIG. 1C depicts a cross-sectional diagram of the read element RE. The central deposition layer D is disposed between first and second insulating half-gaps G1, G2. The half-gaps G1, G2 are typically alumina ($Al_2O_3$). The half-gaps electrically insulate the resistor R from other structures in the read element RE. The half-gaps G1, G2 also act as barriers to oxidation. The half-gap G1 may be deposited on a shield S', which may be made of a ferrite material.

The read element RE may be any type of magneto-resistive sensor such as a spin valve or tunnel junction valve. Furthermore, in any of the embodiments described and depicted herein, the magneto-resistive sensor may be an advanced magneto-resistance (AMR) device (e.g., a tri-layer device) or a giant magneto-resistance (GMR) device.

The contacts C1, C2 electrically connect the magneto-resistive sensor MR to the leads L1, L2. In some applications, the contacts C1, C2 may comprise a material characterized by a permanent magnetic moment to provide a magnetic bias to the sensor MR.

The leads L1, L2 may be made from Au—Ti. The leads L1, L2 connect the read element RE to sensor electronics (not shown). The sensor electronics sense a signal from the read element caused by a change in the electrical resistance of the read element due to an external magnetic field as is well known in the art.

The shield S is typically made from an electrically conductive and magnetically permeable material. Suitable materials include Permalloy, FeN alloys, NiFeN alloys, layered FeN/NiFeN films, layered Fe/Ta films, or films comprising CoZrTa alloys.

The resistor R electrically connects one or more of the leads L1, L2 to an electrically conductive magnetic shield S. The resistor R is disposed between the leads L1, L2. In the embodiment shown in FIG. 1, the resistor R is connected to lead L2. Preferably, the resistor R is connected to the more positive of the two leads L1, L2. Alternatively, the resistor R may be electrically connected to the more negative lead of the two leads L1, L2. Although the resistor R is depicted in FIG. 1 as being connected only to lead L2, resistor R may alternatively be connected only to lead L1 or to both leads L1 and L2 and then tapped to form a connection to the shield S and/or S'. If the resistor R is connected to both leads L1, L2, the resistor R preferably has a resistance significantly greater, for example 100 or more times greater, than that of the magneto-resistive sensor MR. Otherwise the resistor R would act as a short circuit between the leads L1, L2.

The resistor R is preferably disposed, i.e. physically located, between the first and second leads L1 and L2. The resistor R preferably lies within the boundary of an underlying shield layer, e.g. shield S', which thus provides a planar platform to ensure the integrity of resistor R. The resistor R continuously discharges electric charge that builds up on the conductive magnetic shield S. The resistor R may be deposited on half-gap G1 by conventional means. The resistor typically has a resistance that is large enough to protect against telegraph noise (TGN) caused by electrical shorting due to bridging of the conductive magnetic shield S and the lead that is not connected to the resistor R. The resistance of resistor R is also typically small enough to prevent a tribologic build-up of electric charge on the shield S. The resistance of resistor R may be between about 10 k$\Omega$ and about 200 k$\Omega$. The resistor R is typically a thin film resistor disposed in substantially the same substrate plane as the magneto-resistive sensor. In a particular embodiment of the invention, the resistor R is a serpentine thin film resistor that has been deposited in substantially the same substrate plane as the magneto-resistive sensor MR. In one embodiment of the invention, the resistor R is comprised of tantalum. More specifically, the resistor R may be made of beta-tantalum, which has an electrical resistivity of about 170 $\mu\Omega$-cm. Alternatively, the resistor R may be made of conductive, e.g. doped polysilicon or CoPtCr.

The resistance of resistor R depends directly on its length and inversely on the product of its thickness and width. Resistor R may be fabricated by thin film fabrication techniques, such as photolithography, as is known to those skilled in the art. An exemplary tantalum resistor R has a width in the range between about 2 $\mu$m and about 3 $\mu$m and a thickness of between about 100 and about 300 angstroms (Å), preferably about 150 Å.

Figure 2A:
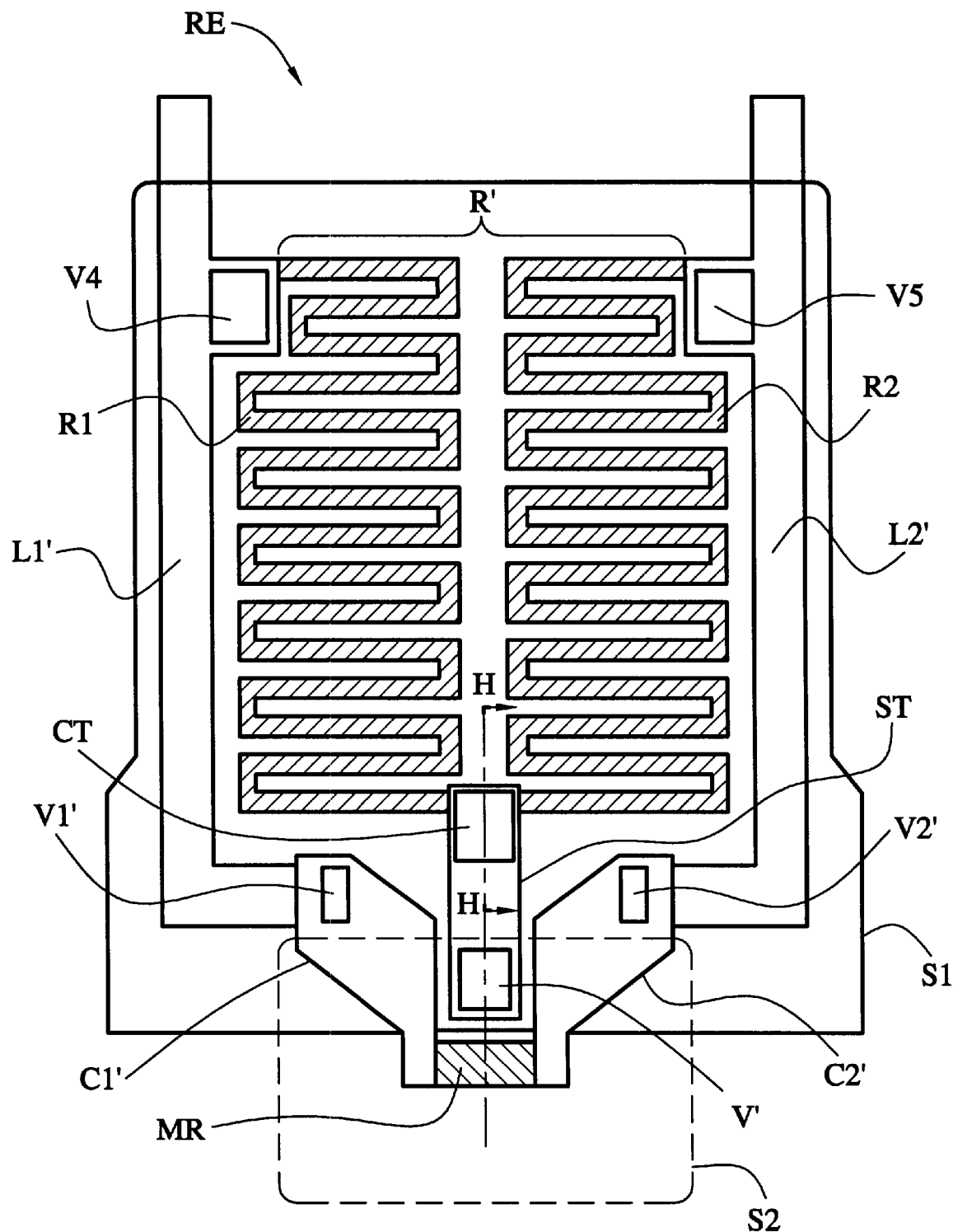
FIG. 2A shows a simplified diagram of a read element according to an alternative embodiment of the invention.
Figure 2B:
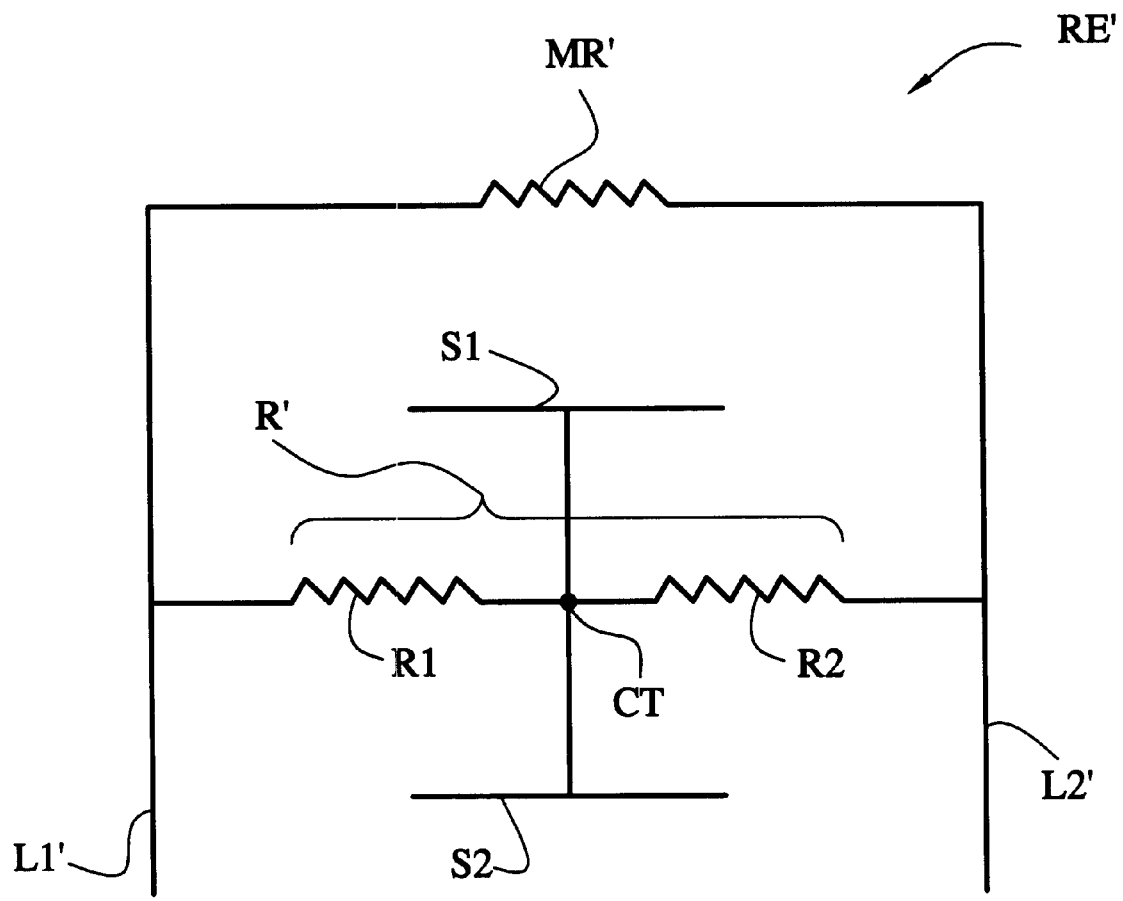
FIG. 2B shows a schematic diagram of an electrical circuit equivalent to the read element depicted in FIG. 2A.

An alternative embodiment of a read element RE' is shown in FIGS. 2A–2B. FIG. 2A shows a schematic diagram of a read element RE' according to an embodiment of the present invention. FIG. 2B shows a schematic diagram of an equivalent electrical circuit. The read element RE' includes a magneto-resistive sensor MR', leads LI', L2', first and second magnetic shields S1, S2, and resistor R'. The magneto-resistive sensor MR', leads L1', L2', and resistor R' have features in common with the magneto-resistive sensor MR, leads L1, L2, and resistor R described above with respect to FIG. 1. For example, the magneto-resistive sensor MR', leads L1', L2', and resistor R' may all lie within substantially the same plane. The resistor R' is disposed between the leads L1', L2'. In the embodiment depicted in FIGS. 2A–2B, shields S1, S2 are located adjacent to the plane containing the magneto-resistive sensor MR' such that the magneto-resistive sensor MR' is disposed between the first and second magnetic shields S1, S2. By way of example, if the magneto-resistive sensor MR' lies in a substantially horizontal plane, shield S1 may be disposed below the plane containing the magneto-resistive sensor MR' and shield S2 may be disposed above the plane. In the embodiment shown, the resistor R' lies over the first shield S1. In such a configuration shield S1 may serve as both a magnetic tape flux shield and an electromagnetic shiel that shields the resistor R' from unwanted elecromagnetic interference (EMI). The second shield S2 covers the mahgneto resistive read sensor MR' but not the resistor R'.

In the embodiment depicted in FIGS. 2A–2B, resistor R' is connected between lead L1' and lead L2'. Both shields S1 and S2 are connected to the resistor R' via a center tap CT located approximately halfway along the length of the resistor. The center tap CT effectively divides the resistor R' into two serpentine resistor segments R1, R2 of approximately equal resistance. This configuration acts as a voltage divider network that maintains the shields S1, S2 at a voltage level that is roughly halfway between the voltages on the leads L1', L2'. Those skilled in the art will recognize that center tap CT may alternatively be located at any point on resistor R', e.g. a point that is closer to one of the leads L1', L2', to maintain the shields at a different voltage. Generally, it is desirable that the resistance between the center tap CT and either of the leads L1', L2' be between about 10 k$\Omega$ and about 200 k$\Omega$ to prevent tribocharging of the shields S1, S2 and to protect against telegraph noise.

Typically, at least one of the shields S1, S2 is made from an electrically conductive material. Both shields S1, S2 need not be electrically conductive. For example, one of the shields may comprise a ferrite material, which is typically not electrically conductive. In such a case the resistor R' need not be connected to whichever of the shields S1, S2 is not electrically conductive. Of course, if both shields S1, S2 are made of non-conductive ferrite material, e.g., NiZn or MnZn, tribocharge cannot build up on the shields S1, S2, and the resistor R' may be dispensed with entirely. Alternatively, both shields S1, S2 may comprise electrically conductive materials. When both shield S1, S2 are electrically conductive, the resistor R' is electrically connected by the center tap CT to both the first and second shields S1, S2 as shown in FIG. 2A.

Figure 3A:
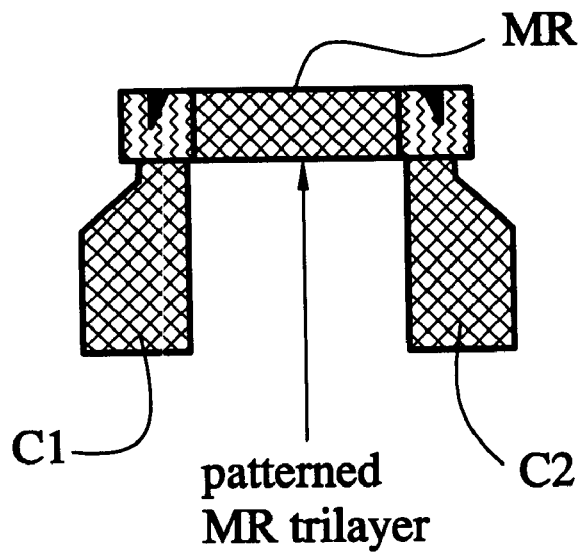
FIGS. 3A–3D schematically depict an embodiment of a method for fabricating a read element.
Figure 3B:
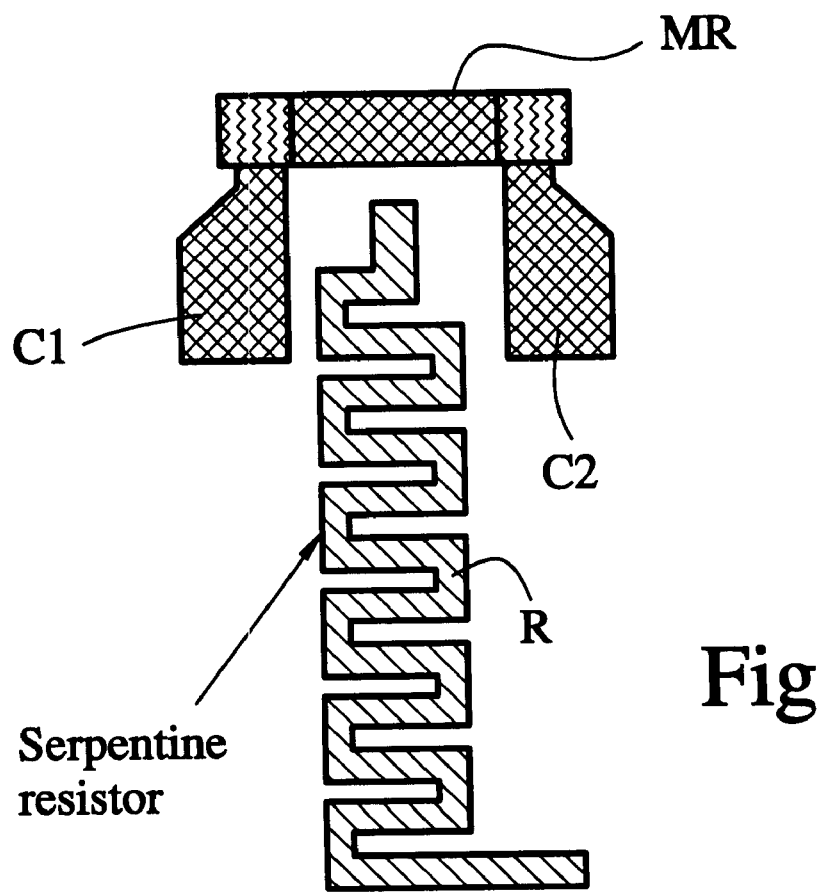

Read elements of the type depicted and described above with respect to FIGS. 1A–1C and FIG. 2A–2B may be fabricated using planar thin-film processing techniques as depicted in FIGS. 3A–3D. As shown in FIG. 3A the magneto resistive sensor MR is deposited on the half-gap G1. Connections C1, C2 to the leads may also be deposited at this time. Next, as shown in FIG. 3B the resistor R is deposited over the half-gap G1 in the space between where the leads will go.

Figure 3C:
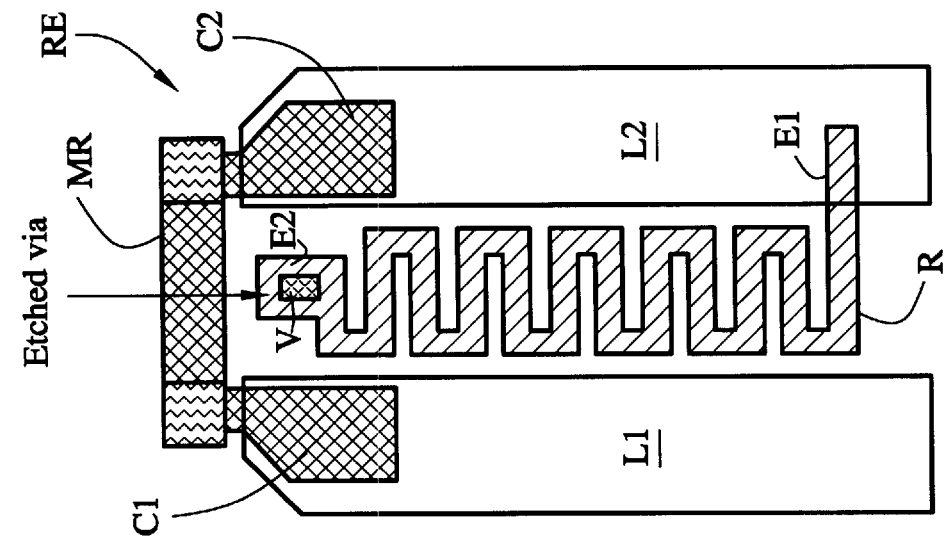

Preferably, the resistor R is deposited within the boundary of an underlying shield, e.g., shield S' of FIG. 1C or shield S2 of FIG. 2B. Next, as shown in FIG. 3C, the leads L1, L2 are deposited over the half-gap G1. The leads L1, L2 partly cover the connections C1, C2 to provide electrical contact to the magneto-resistive sensor MR. The resistor R is disposed between the leads L1, L2. In the embodiment shown, the lead L2 is deposited partly over the resistor R at a first end E1 to provide an electrical connection between the lead L2 and the resistor R. Those of skill in the art will recognize that when a center-tapped resistor is used lead L1 partially covers the resistor R at a second end.

Figure 3D:
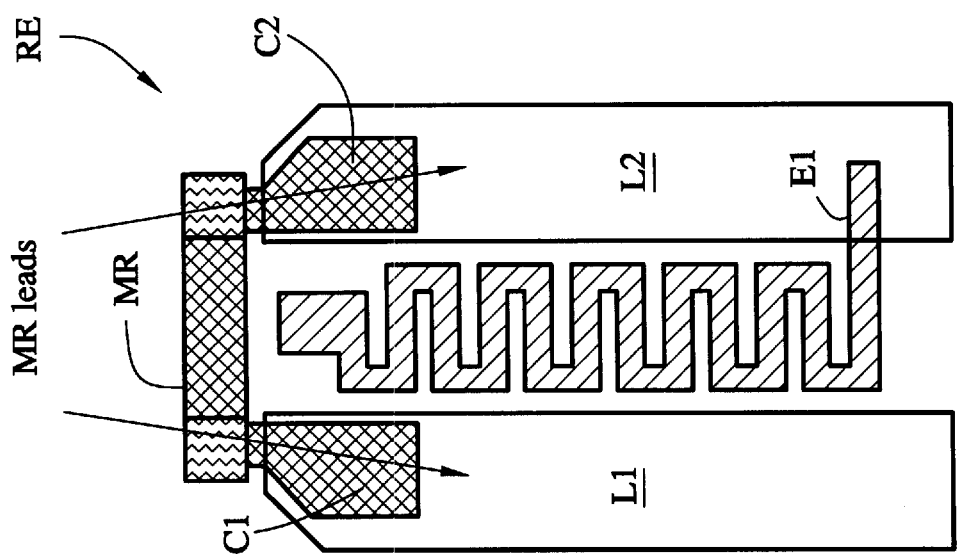

After the leads L1, L2 have been deposited, the second half-gap G2 is deposited. To make electrical contact between the shield S and the resistor R, a via V may be formed through the second half-gap G2 to expose the resistor R at a second end E2 as shown in FIG. 3D. The via V may be formed by any suitable technique, e.g. chemical etching. Subsequently, the shield S is formed over the second half-gap G2 and the via V. The conductive material of the shield S fills the via V forming an electrical contact between the shield S and the resistor R. Those of skill in the art will recognize that when a center tapped resistor R is used, the via V may be formed in the resistor R near its center. Alternatively, the resistor R may be connected to the leads and shields by other means.

When the read element RE is sandwiched between two electrically conductive shields, as described above with respect to FIGS. 2A–2B, electrical contact may be made to both of the shields by etching a via all the way through the first shield, the first half-gap, the resistor, the second half-gap and the second shield. The via may then be filled with a conductive material to make electrical contact between the resistor R and both shields.

The read elements described above may be fabricated by another method according to an alternative embodiment of the invention. The alternative embodiment is depicted in the cross sectional diagrams of FIGS. 4A–4E. In the alternative embodiment, the resistor is connected to two conductive magnetic shields. The alternative method is best understood by simultaneously referring to FIGS. 2A–2B and FIGS. 4A–4E.

Figure 4A:
FIGS. 4A–4E depict cross sectional schematics of an alternative embodiment of a method for fabricating a read element.
Figure 4B:
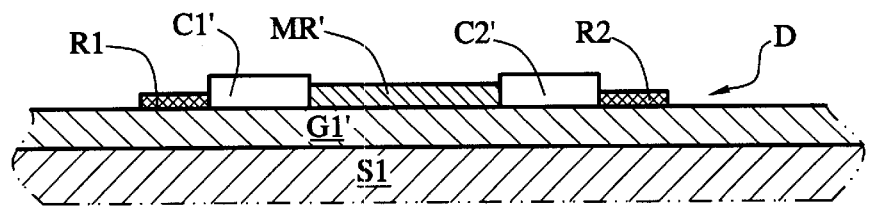
Figure 4C:
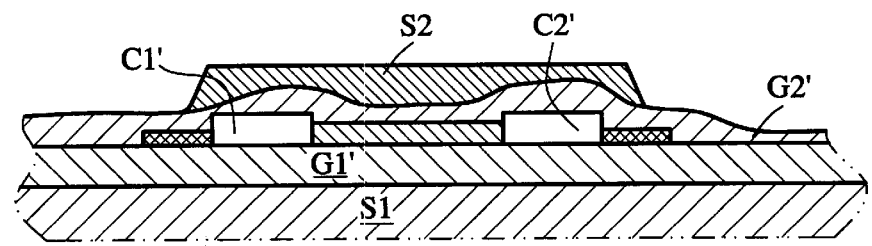

As shown in FIG. 4A, the method begins by providing a first shield such as shield S1 of FIGS. 2A–2B. A first insulating layer G1', sometimes referred to as a gap layer, is formed over the first shield S1 as depicted in FIG. 4A. The elements of the deposition layer D', e.g., magneto-resistive sensor MR', contacts C1', C2' and resistor R', are deposited over the first insulating layer G1' as shown in FIG. 4B. As described above, the contacts C1', C2' are in electrical contact with the sensor MR'. In the embodiment shown, the resistor R' is made of two resistive segments R1, R2, although a single resistor may alternatively be used. Next, a second insulating layer G2' is formed over the first insulating layer G1' such that the sensor MR', contacts C1', C2' and resistor R' are disposed between the first and second insulating layers G1', G2' as shown in FIG. 4C. Next, the second shield S2 is deposited on the second insulating layer G2'. As seen in FIG. 2A, the second shield S2 covers the magneto-resistive sensor MR' and a portion of each of the contacts C1', C2', but does not cover the resistor R'.

Figure 4D:
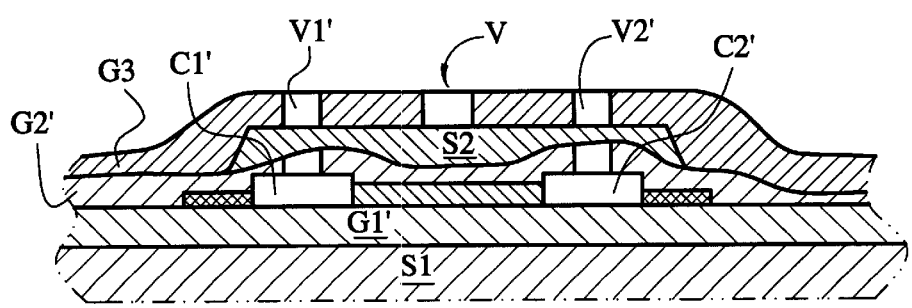

As shown in FIG. 4D, the second shield S2 is then insulated by forming a third insulating layer G3 over the second shield S2, overlying the remaining structure, e.g., resistor R', contacts C1', C2' and second insulating layers G2'. As shown in FIG. 4D, via V' is then formed through the third insulating layer G3 to the second shield S2. Vias V1' and V2' may be formed through the second and third insulating layers G2', G3 to the contacts C1', C2' (bypassing the second shield S2).

Figure 4E:
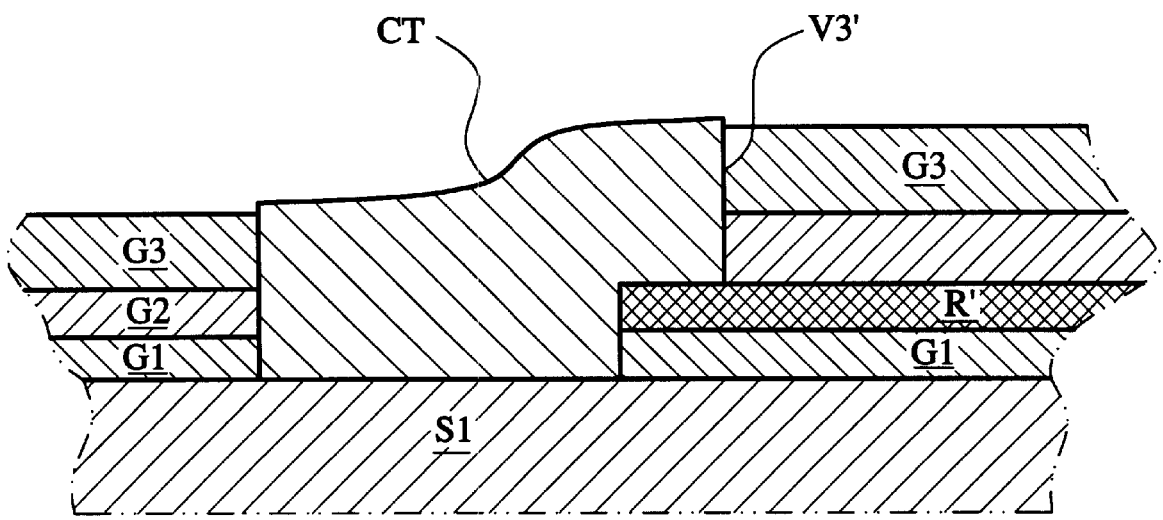

Center tap connection CT may be made as shown in FIG. 4E. FIG. 4E is a partial cross sectional view along line 4—4 of FIG. 2A. Via V3' is formed through the first, second and third insulating layers G1', G2', G3 such that the via V3' exposes a portion of the resistor R' and a portion of the first shield S1. Specifically V3' may expose a center of the resistor R'. Where tantalum is used to form the resistor R' the tantalum may act as an etch stop. The center tap connection CT may be formed by filling the via V3' with a conducting material, such as copper. The center tap connection CT thereby electrically connects the resistor R' to the first shield S1.

Referring back to FIG. 2A, additional vias V4, V5 are formed through the second and third insulating layers G2', G3 to expose the ends of the resistor R'. Generally, vias V4, V5 do not extend all the way through the first gap layer G1 to the first shield S1. Electrically conductive connections between one or more of the ends of the resistor R' and one or more of the contacts C1', C2' may be formed by filling the vias V1, V2, V4, V5 with conductive material and depositing conductive leads L1' L2' on the third insulating layer G3. The lead L1' may extend, e.g., between via V1' and via V4. The lead L2' may extend between via V2' and via VS. In a similar fashion, contact may be made between a second end of the resistor, e.g. center tap CT, and the second shield S2 by filling the via V' with conductive material and forming a conductive strap ST over the third insulating layer between the center tap CT and the via V'. In such a fashion, the shield S1 and shield S2 may be electrically connected to each other by the center tap connection CT. In a preferred embodiment, the vias V', V1', V2', V3', V4', V5' are filled and the leads L1', L2' and strap ST are formed in the same process step, i.e. at substantially the same time.

Figure 5:
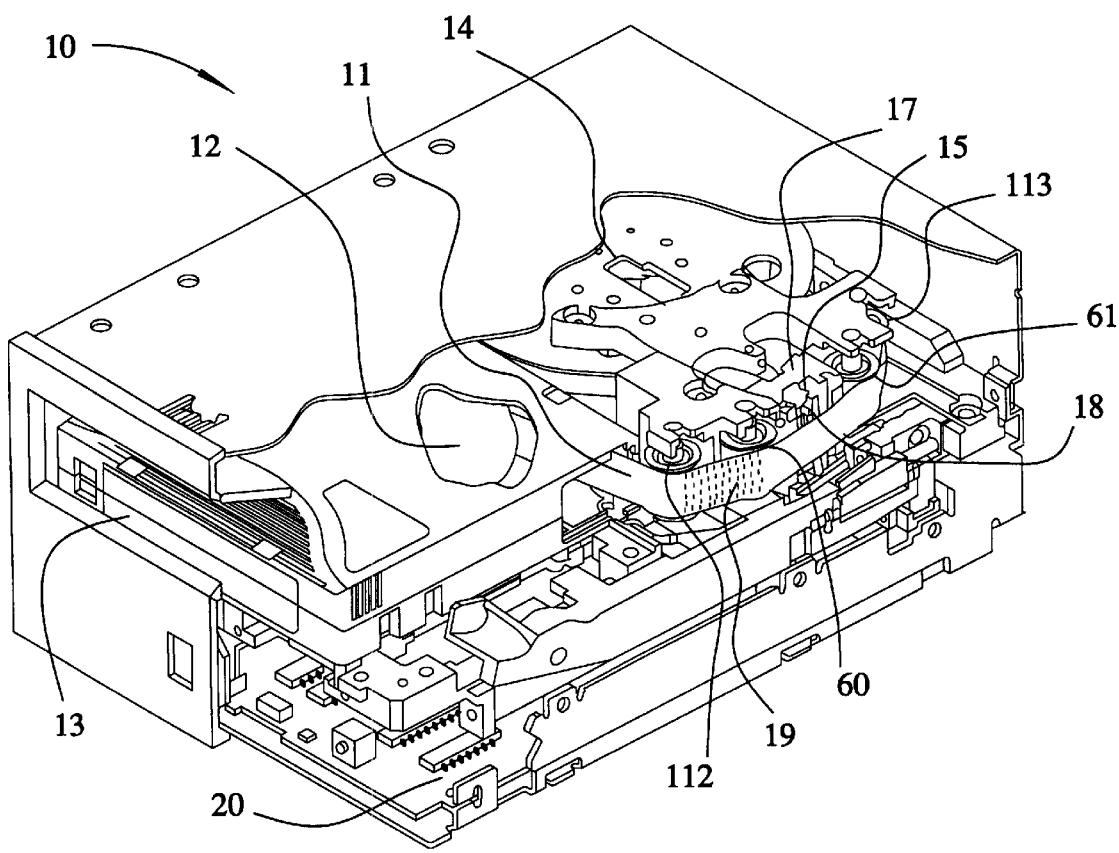
FIG. 5 shows a simplified schematic drawing of a magnetic tape drive that incorporates a read element according to an embodiment of the present invention.

The inventive read element described above with respect to FIGS. 1A–2B may be incorporated into an inventive tape drive 10 as shown in FIG. 5. In the tape drive 10, a magnetic tape 11 moves a long a tape path from a supply reel 12, e.g., in a cartridge 13 to a take up reel 14. The reels 12 and 14 may comprise drive reels of a drive system operated by drive motors (not shown). The magnetic tape moves along the tape path across a tape head 15. The tape head 15 is typically supported by an actuator 17 of a servo system. By way of example, actuator 17 may comprise a compound actuator. The tape head 15, e.g., a magnetic tape head, may comprise one or more read elements 18 and write elements. The read elements 18 have features in common with the read element RE described above. In particular, the read elements 18 incorporate a resistive shunt between one or more leads and one or more shields. The tape 11 may comprise a plurality tracks 19 such as data tracks or servo tracks. Consequently, the read elements 18 may include data read elements and/or servo read elements. Data read elements sense magnetic fields corresponding to data stored on the tape 11. Servo read elements are typical parts of a s track following servo system for moving the tape head 15 in a lateral direction for following lateral movement of the longitudinal tracks as the tape 11 moves in the longitudinal direction and, thereby, position the tape head 15 at the data tracks and follow the data tracks. The tape drive may optionally include one or more write elements for writing data onto the tape 11.

The tape head 15 may optionally include a plurality of read elements that are arranged to serve as multiple parallel channels. The read elements may have different magneto-resistive and or resistor design characteristics for use in a multi-track tape system having same-surface servo capability.

It will be clear to one skilled in the art that the above embodiment may be altered in many ways without departing from the scope of the invention. Accordingly, the scope of the invention should be determined by the following claims and their legal equivalents.

What is claimed is:

1. A method for fabricating a read element, comprising:

A) providing a first shield;

B) forming a first insulating layer over the first shield;

C) forming on the first insulating layer a magneto-resistive sensor, a resistor having a first end and a second end, and first and second contacts electrically connected to the sensor;

D) forming a second insulating layer over the first insulating layer such that the sensor, contacts and resistor are disposed between the first and second insulating layers;

E) forming a second shield over the second insulating layer such that the second shield covers the sensor and a portion of each of the contacts;

F) forming a third insulating layer over the second shield and the second insulating layer;

G) forming a first via through the third insulating layer to the second shield;

H) forming a second via through the first, second, and third insulating layers to the first shield, wherein the second via exposes a portion of the resistor between the first end and the second end of the resistor;

I) forming third and fourth vias through the second and third insulating layers to the first and second ends, respectively, of the resistor;

J) forming fifth and sixth vias through the second and third insulating layers to the first and second contacts, respectively;

K) forming electrically conductive interconnections between the first end of the resistor at the third via and the first contact at the fifth via, between the second end of the resistor at the fourth via and the second contact at the sixth via, and between the first shield and exposed portion of the resistor at the second via and second shield at the first via.

2. The method of claim 1, wherein G), H), I) and J) are performed substantially simultaneously.

* * * * *